United States Patent [19]
Cook et al.

[11] Patent Number: 5,967,487
[45] Date of Patent: Oct. 19, 1999

[54] AUTOMOTIVE EMISSION CONTROL VALVE WITH A CUSHION MEDIA

[75] Inventors: John E. Cook; Murray F. Busato; David W. Balsdon; Gerry Bruneel; Rick Van Wetten; Robert Faulkner; Derek Hime, all of Chatham, Canada

[73] Assignee: Siemens Canada Ltd., Mississauga, Canada

[21] Appl. No.: 08/918,070

[22] Filed: Aug. 25, 1997

[51] Int. Cl.[6] ............................. F16K 39/02; F16K 31/06
[52] U.S. Cl. .................. 251/64; 251/129.07; 251/129.18
[58] Field of Search ......................... 251/129.07, 129.15, 251/129.17, 129.18, 129.08, 64; 123/520, 521

[56] References Cited

U.S. PATENT DOCUMENTS

| | | |
|---|---|---|
| 1,389,625 | 9/1921 | Churchward . |
| 2,829,860 | 4/1958 | Garner et al. ....................... 251/129.17 |
| 3,446,471 | 5/1969 | Westphal ............................ 251/129.17 |
| 3,446,473 | 5/1969 | Barker ....................................... 251/64 |
| 3,510,814 | 5/1970 | Nordfors . |
| 3,538,951 | 11/1970 | Bownass . |
| 3,752,134 | 8/1973 | Hollis, Jr. . |
| 4,377,146 | 3/1983 | Oniki et al. . |
| 4,556,085 | 12/1985 | Warrick . |
| 4,577,607 | 3/1986 | Nishio . |
| 4,628,887 | 12/1986 | Mitchell et al. . |
| 4,703,737 | 11/1987 | Cook et al. . |
| 4,858,886 | 8/1989 | Tatara ................................... 251/129.07 |
| 4,869,461 | 9/1989 | Perry et al. . |
| 4,901,702 | 2/1990 | Beicht et al. . |
| 4,901,974 | 2/1990 | Cook et al. ......................... 251/129.15 |
| 4,944,276 | 7/1990 | House et al. . |
| 5,307,774 | 5/1994 | Hammer ............................. 251/129.17 |
| 5,326,070 | 7/1994 | Baron . |
| 5,413,082 | 5/1995 | Cook et al. .............................. 123/520 |
| 5,448,981 | 9/1995 | Cook et al. .............................. 123/520 |
| 5,474,050 | 12/1995 | Cook et al. .............................. 123/520 |
| 5,499,614 | 3/1996 | Busato et al. ........................... 123/520 |
| 5,509,395 | 4/1996 | Cook ....................................... 123/520 |
| 5,551,406 | 9/1996 | Everingham et al. . |

*Primary Examiner*—John Rivell

[57] ABSTRACT

A valve assembly (14) has an internal main flow passage through a valve body (24) between a first port (25) and a second port (26), an electric actuator (30), and a valve (86) operated by an armature (58) of the actuator to selectively open and close the passage. A force-balancing mechanism (92) applies to the valve (86) a force that opposes force created by pressure differential between the first and second ports. The valve has cushion media (76, 80, 142) that cushions impact of lateral displacements of the armature and cushion media (76) for cushioning axial impact between the armature and stator. An overmold (32) encloses internal parts, and one of the ports contains sonic nozzle structure (28). the valve exhibits improved noise attenuation, durability, and performance.

19 Claims, 6 Drawing Sheets

AUTOMOTIVE EMISSION CONTROL VALVE WITH A CUSHION MEDIA

FIELD OF THE INVENTION

This invention relates generally to on-board emission control systems for internal combustion engine powered motor vehicles, evaporative emission control systems for example, and more particularly to a new and unique emission control valve, such as a canister purge solenoid (CPS) valve for an evaporative emission control system.

BACKGROUND OF THE INVENTION

A typical on-board evaporative emission control system comprises a vapor collection canister that collects fuel vapor emitted from a tank containing volatile liquid fuel for the engine and a CPS valve for periodically purging collected vapor to an intake manifold of the engine. In a known evaporative system control system, the CPS valve comprises a solenoid that is under the control of a purge control signal generated by a microprocessor-based engine management system. A typical purge control signal is a duty-cycle modulated pulse waveform having a relatively low operating frequency, for example in the 5 Hz to 20 Hz range. The modulation may range from 0% to 100%. This means that for each cycle of the operating frequency, the solenoid is energized for a certain percentage of the time period of the cycle. As this percentage increases, the time for which the solenoid is energized also increases, and therefore so does the purge flow through the valve. Conversely, the purge flow decreases as the percentage decreases.

Changes in intake manifold vacuum that occur during normal operation of a vehicle may also act directly on a CPS valve in a way that upsets the intended control strategy unless provisions, such as a vacuum regulator valve for example, are included to take their influence into account. When the CPS valve is closed, manifold vacuum at the valve outlet is applied to the portion of the valve element that is closing the opening bounded by the valve seat. Changing manifold vacuum affects certain operational characteristics of such a valve, potentially causing unpredictable flow characteristics.

The particular construction of a solenoid-actuated valve, and certain external influences thereon, may impair certain operational characteristics, such as the start-to-flow point and the incremental low-flow characteristic.

From commonly assigned U.S. Pat. No. 5,413,082, inter alia, it is known to incorporate a sonic nozzle function in a CPS valve to reduce the extent to which changing manifold vacuum influences flow through the valve during canister purging. From U.S. Pat. No. 5,373,822, it is known to provide pressure- or force-balancing of the armature/valve element.

From other patents, such as commonly assigned U.S. Pat. No. 4,901,974 issued Feb. 20, 1990, it is known to incorporate noise-attenuating bumpers to absorb impact forces created by abutment of the armature with stops as the armature reciprocates.

SUMMARY OF THE INVENTION

The present invention relates to an automotive emission valve having various features that individually and collectively are believed to achieve improved performance, including more predictable purge flow control in spite of influences that tend to impair control accuracy and improved attenuation of internally generated operating noise.

In accomplishment of one or more of the foregoing improvements, another aspect of the present invention relates to an electric-operated valve assembly comprising a body having an internal main flow passage between a first port and a second port, an annular valve seat in circumscribing relation to the passage, an electric actuator comprising an armature and a guide hole within which the armature is guided substantially for axial motion but with some lateral clearance that allows slight lateral displacements of the armature to occur as the armature is moved axially by the actuator, a valve which is connected to a portion of the armature that protrudes axially outward from an open axial end of the guide hole and which is operated by the armature to selectively open and close the passage, and a medium that cushions impact of lateral displacements of the armature, the medium being disposed around that portion of the armature that protrudes axially outward from an open end of the guide hole.

In accomplishment of one or more of the foregoing improvements, another aspect of the present invention relates to an electric-operated valve assembly comprising a body having an internal main flow passage between a first port and a second port, an annular valve seat in circumscribing relation to the passage, an electric actuator comprising a guide hole, a walled sleeve extending axially in the guide hole, an armature guided substantially for axial motion within the sleeve but with some lateral clearance that allows slight lateral displacements of the armature to occur as the armature is moved axially by the actuator, a valve operated by the armature to selectively open and close the passage, and a medium that cushions impact of lateral displacements of the armature, the medium being disposed between the sleeve and the guide hole.

In accomplishment of one or more of the foregoing improvements, another aspect of the present invention relates to an electric-operated valve assembly comprising a body having an internal main flow passage between a first port and a second port, an annular valve seat in circumscribing relation to the passage, an electric actuator comprising a stator and an armature, a valve which is operated by the armature to selectively open and close the passage, the armature and the stator having respective complementary confronting surface formations, one formation comprising a tapered projection and the other formation comprising a tapered depression, the projection and the depression having partial axial overlap when the valve is closing the passage.

In accomplishment of one or more of the foregoing improvements, another aspect of the present invention relates to an electric-operated valve assembly comprising a body having an internal main flow passage between a first port and a second port, an annular valve seat in circumscribing relation to the passage, an electric actuator comprising a stator and an armature, a valve which is operated by the armature to selectively open and close the passage, the armature and the stator having respective complementary confronting surface formations, one formation comprising a tapered projection and the other formation comprising a tapered depression, a cushion for absorbing axial impact of the tapered projection with the tapered depression.

Within the foregoing generic aspects, further ancillary aspects of the present invention relate to an overmold that encloses internal component parts that have been assembled into the valve body, to certain details of an electromagnetic actuator for operating the valve, to sonic nozzle structure for the purge flow, and to certain details of the valve and its integration with a force-balancing mechanism. The finished valve has improved noise attenuation, durability, and performance.

The foregoing, and other features, along with various advantages, benefits, and principles of the invention, will be seen in the ensuing description and claims which are accompanied by drawings. The drawings, which are incorporated herein and constitute part of this specification, illustrate a preferred embodiment of the invention according to the best mode contemplated at this time for carrying out the invention.

DESCRIPTION OF THE PREFERRED EMBODIMENT

Figure 1:
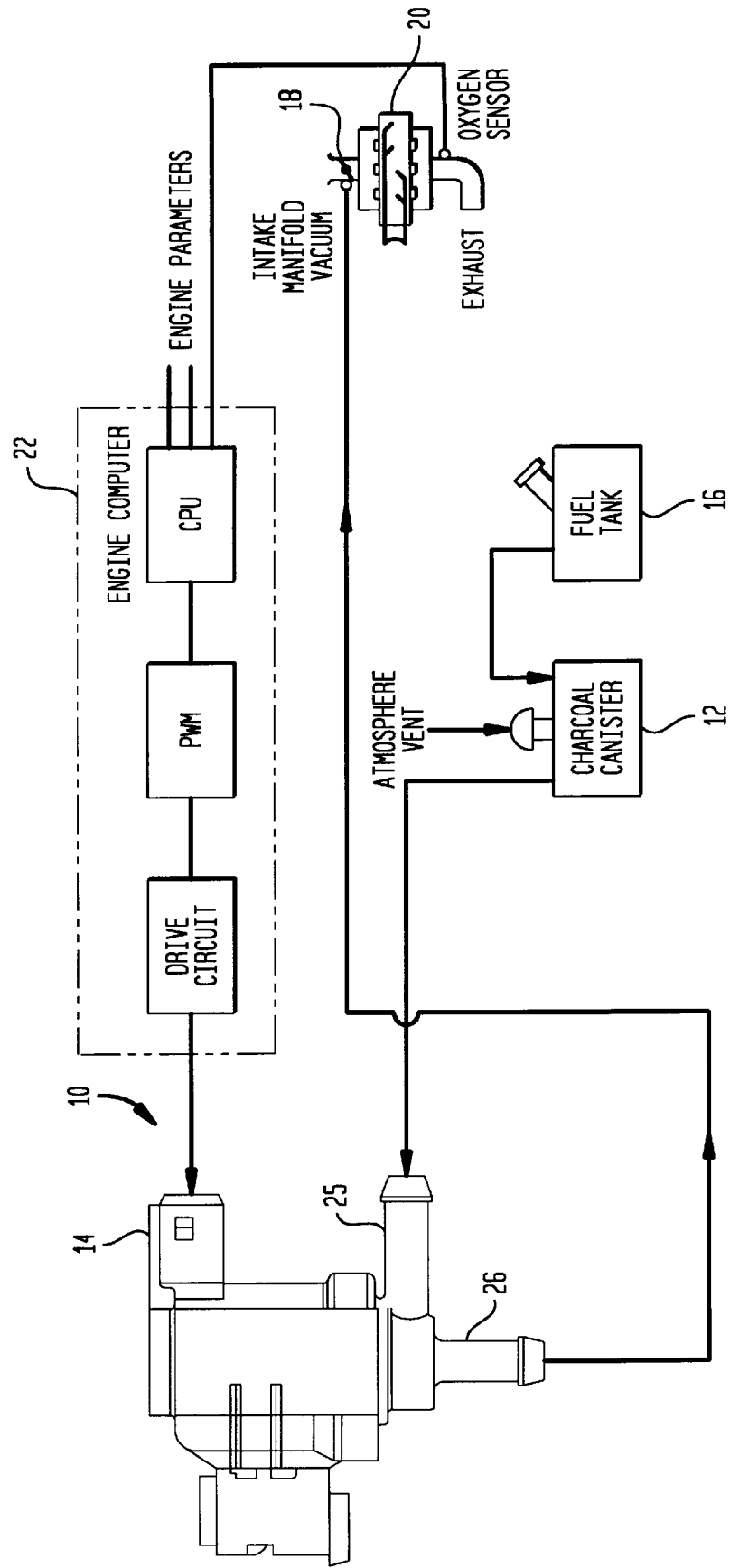
FIG. 1 is a schematic diagram of an evaporative emission control system comprising an emission control valve embodying principles of the invention.
Figure 2:
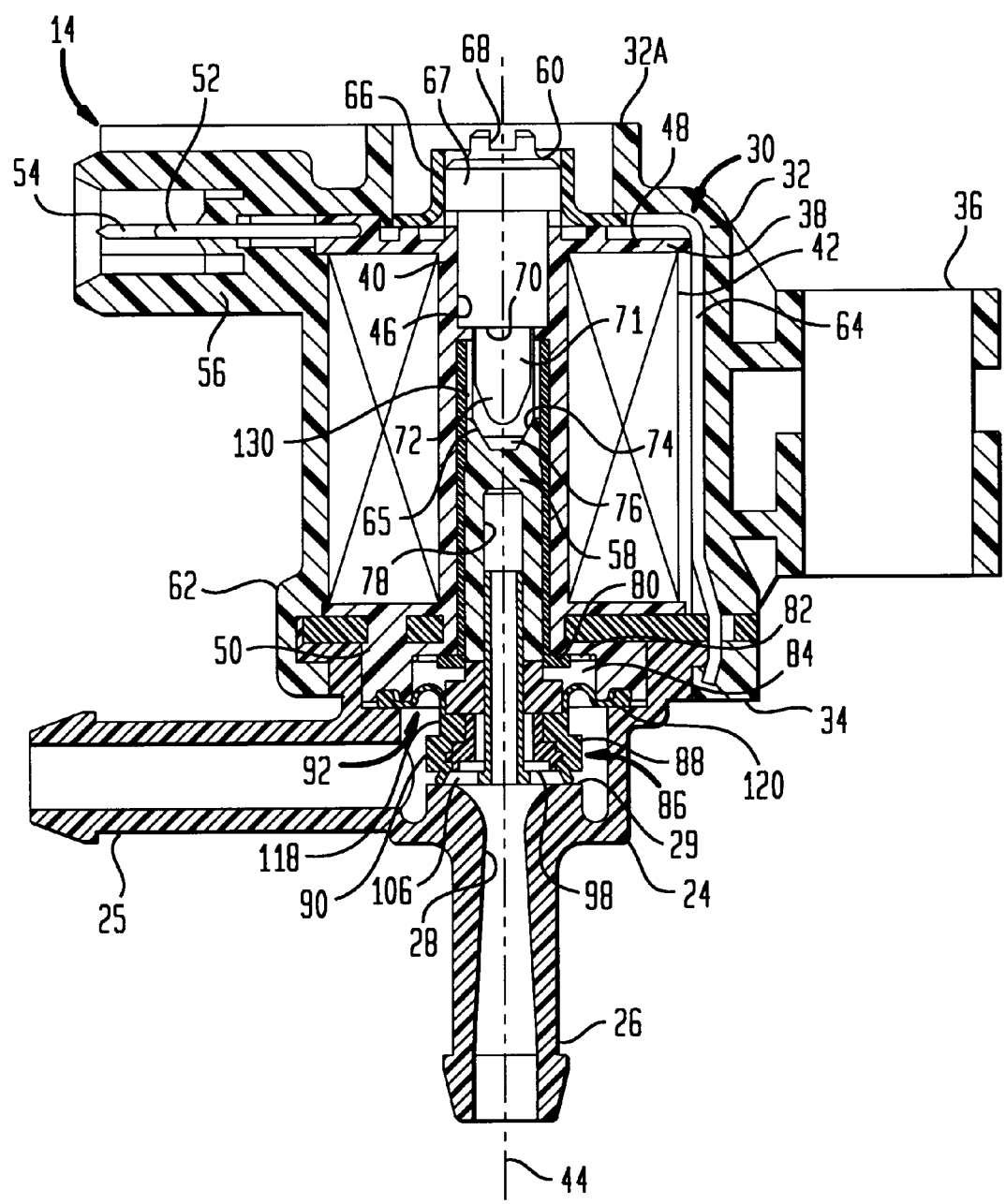
FIG. 2 is a longitudinal cross section view through the emission control valve of FIG. 1.
Figure 3:
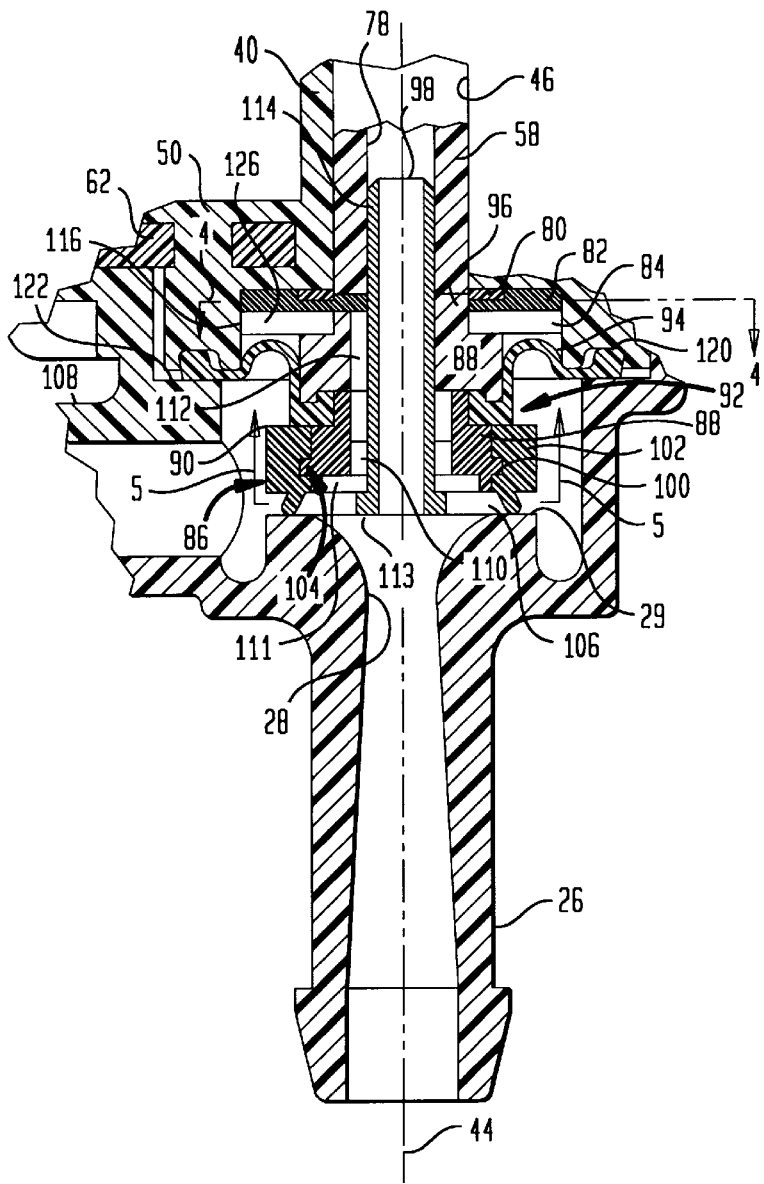
FIG. 3 is an enlarged fragmentary view of a portion of FIG. 2.
Figure 4:
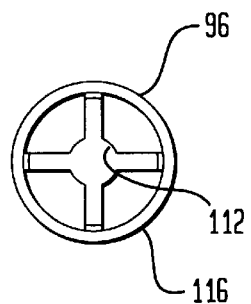
FIG. 4 is a fragmentary transverse cross section view in the direction of arrows 4—4 in FIG. 3.
Figure 5:
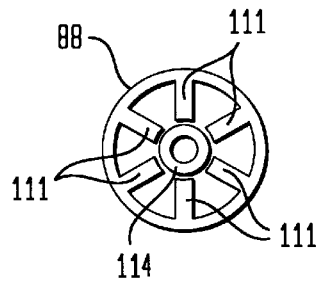
FIG. 5 is a fragmentary transverse cross section view in the direction of arrows 5—5 in FIG. 3.

FIG. 1 shows an evaporative emission control system of a motor vehicle comprising a vapor collection canister 12 and an emission control valve 14, embodying principles of the present invention, connected in series between a fuel tank 16 and an intake manifold 18 of an internal combustion engine 20 in customary fashion. An engine management computer 22 that receives various input signals supplies a purge control output signal for operating valve 14.

Detail of valve 14 appears in FIGS. 2–5. Valve 14 comprises a body part 24 having an inlet port 25 and an outlet port 26, the latter including a sonic nozzle structure 28. Body part 24 is fabricated from suitable fuel-tolerant material, such as by injection molding, and embodies the two ports as respective nipples. At the internal end of the nipple forming outlet port 26, an annular seating surface 29 circumscribes an internal main flow passage extending between the two ports.

Valve 14 further comprises a solenoid assembly 30 that is housed within an overmold 32. A joint 34 joins overmold 32 with body part 24 such that the two may be considered to constitute the body of valve 14. Overmold 32 includes a formation 36 that provides for the mounting of the valve at a suitable mounting location on an automotive vehicle.

Solenoid assembly 30 comprises a polymeric bobbin 38 around whose central tubular core 40 an electromagnetic coil 42 is disposed. Reference numeral 44 designates an imaginary longitudinal axis of valve 14 with which core 40 and outlet port 26 are coaxial. Core 40 comprises a circular cylindrical through-hole 46 that is open at opposite axial ends through respective radially directed annular end walls 48, 50 of bobbin 38. Terminations of magnet wire that forms coil 42 are joined to respective electric terminals 52, 54 whose proximal ends are mounted on wall 48. Distal ends of these terminals project radially, passing through overmold 32 where they are laterally bounded by a surround 56, which is an integral formation of the overmold, so that the valve is provided with an electric connector for making connection to a complementary connector (not shown) leading to the management computer.

Solenoid assembly 30 further comprises magnetic circuit structure for concentrating magnetic flux generated by coil 40 when electric current is delivered to the coil via terminals 52, 54. The magnetic circuit structure comprises an armature 58 and a multi-part stator structure that comprises stator parts 60, 62, and 64.

Stator part 60 is a generally cylindrical pole piece that is disposed at one end of the solenoid assembly coaxial with axis 44. Stator part 62 is another pole piece that is disposed at the opposite end of the solenoid assembly coaxial with axis 44. Stator part 64 is a part that completes the magnetic circuit between the two stator pole piece parts 60, 62 exterior of the coil and bobbin. The magnetic circuit includes an air gap 65 between stator part 60 and armature 58; it also includes a gap between armature 58 and stator part 62 occupied by material of bobbin 38.

A portion of stator part 64 comprises a cylindrical wall 66 which is disposed coaxial with axis 44 and with which a head 67 of stator part 60 has a threaded engagement. Overmold 32 stops short of wall 66, comprising a cylindrical surround 32A, to allow external access to stator part 60. Head 67 comprises a tool engagement surface 68 that is accessible through surround 32A for engagement, and ensuing rotation, by a complementary shaped tool (not shown) to adjust the axial position of part 60 along axis 44. A portion of a shank of part 60 passes closely though one axial end of through-hole 46. A distal end portion of this shank comprises a shoulder 70 leading to a reduced diameter section 71 that ends in a tapered tip 72.

Armature 58 comprises a cylindrical shape adapted for axial motion within through-hole 46. One axial end of armature 58 is in juxtaposition to tip 72 of stator part 60 and comprises a nominally flat end surface in whose central region a tapered depression 74 is formed. This depression has a shape complementary to that of tip 72. At the bottom of depression 74 there is an impact absorbing cushion 76, such as an elastomer. Alternatively, cushion could be mounted on tip 72. The opposite axial end of armature 58 comprises a nominally flat end surface whose central region contains a blind circular hole 78 coaxial with axis 44. Radial clearance is provided between armature 58 and the wall of through-hole 46 to allow axial motion of the armature.

When acted upon by magnetic force arising from magnetic flux in the magnetic circuit, armature 58 will not necessarily move with solely an axial component of motion. The motion may be accompanied by a radial, or lateral, component. In order to attenuate undesired consequences, such as noise, resulting from such lateral motion, an impact absorbing cushion 80 is provided external to through-hole 46. The illustrated cushion 80 comprises an elastomeric ring circumscribing the armature, but without imposing any significant influence on desired axial motion of the armature. Cushion 80 is disposed on the inner margin of an annular mounting member 82 whose outer perimeter engages the wall of a counterbore 84 in bobbin end wall 50 to lodge the cushion-retainer assembly in place. Alternatively, cushion 80 and mounting part 82 may be separate parts arranged such that the latter holds the former in place.

A multi-part valve assembly 86 is assembled to armature 58. Assembly 86 comprises a valve head part 88 and a seal part 90. A force-balancing mechanism 92 is associated with valve assembly 86. Mechanism 92 comprises an annular convoluted diaphragm 94 and a retainer 96. The valve assembly and force-balancing mechanism are held in assembly relation with armature 58 by a fastener 98.

Head 88 is generally cylindrical but includes a radially protruding circular ridge 100 midway between its axial ends. Seal 90 comprises a ring-shaped circular body 102 with a groove 104 on its inside diameter providing for body 102 to fit onto the outside diameter of head 88 with ridge 100 lodging in groove 104. A frustoconical sealing lip 106 flares radially outward from the end of body 102 that is toward seat surface 29 to seal there against when valve 14 is in the closed position shown in FIGS. 2 and 3.

Head 88 further comprises an external shoulder 108 at its axial end that is opposite sealing lip 106. Head 88 also comprises a central axially extending through-hole 110. The end of head 88 that is proximate sealing lip 106 comprises a series of circumferentially spaced fingers 111 directed radially inward of the through-hole.

Retainer 96 also has a generally cylindrical shape and comprises a central through-hole 112. The wall of this through-hole is fluted, comprising circumferentially spaced apart, axially extending flutes. Head 88 and retainer 96 are stacked together axially, and the stack is secured to armature 58 by fastener 98 having a press fit to armature 58. Fastener 98 is a hollow tube that has a head 113 and a shank 114. Head 113 bears against radially inner ends of fingers 111, but does not block passage through through-hole 110. Shank 114 passes with clearance through head 88 and retainer 96 and into force-fit with armature hole 78, causing retainer 96 to abut the end of the armature around hole 78. This secures valve assembly 86 to armature 58 so that the two move axially as one.

Retainer 96 further comprises a flange 116 that radially overlaps shoulder 108 of head 88. In assembly, flange 116 and shoulder 108 capture a bead 118 on the inner margin of diaphragm 94 to seal the I.D. of the diaphragm to the O.D. of valve assembly 86. The outer margin of diaphragm 94 comprises a bead 120 that is captured between confronting surfaces of bobbin end wall 50 and an internal shoulder 122 of body part 24. Counterbore 84 and member 94 cooperatively form an internal chamber space 126 as part of force-balancing mechanism 92.

A helical coil bias spring 130 is disposed about the distal end of part 50 with one of its axial ends bearing against a shoulder of part 50 and its opposite end bearing against the flat end surface of armature 58 surrounding depression 74. When no electric current flows in coil 42, spring 130 forces lip 106 against seat surface 29. This closes the main flow passage through the valve between inlet port 25 and outlet port 26. Pressure at outlet port 26 is however communicated to chamber space 126 through a communication passage provided via the through-holes in head 88 and retainer 96. When the main flow passage is closed, it can be seen that tip 72 protrudes slightly into depression 74, creating a slight axial overlap between stator pole piece 60 and armature 58, but tip 72 is spaced from cushion 76.

The delivery of a purge control signal to valve 14 creates electric current flow in coil 42, and this current flow creates magnetic flux that is concentrated in the above-described magnetic circuit. As the current increases, increasing force is applied to armature 58 in the direction of increasingly displacing valve assembly 88 away from seat surface 29. This force is countered by the increasing compression of spring 130. The extent to which valve assembly 88 is displaced away from seat surface 29 is well-correlated with the current flow, and because of force-balancing and the sonic flow, the valve operation is essentially insensitive to varying manifold vacuum. The maximum displacement of armature 58 and valve assembly 86 away from seat surface 29 is defined by abutment of the tapered tip end of the armature with cushion 76.

In the operative emission control system 10, intake manifold vacuum is delivered through outlet port 26 and will act on the area circumscribed by the seating of lip 106 on seat surface 29. Absent force-balancing, varying manifold vacuum will vary the force required to open valve 14 and hence will cause the current flow in coil 42 that is required to open the valve to vary. Force-balancing de-sensitizes valve operation, initial valve opening in particular, to varying manifold vacuum. In the inventive valve 14, force-balancing is accomplished by the aforementioned communication passage through valve assembly 86 to chamber space 126. By making the effective area of the movable wall portion of the chamber space that is formed by diaphragm 94 and valve assembly 86 equal to the area circumscribed by the seating of lip 106 on seat surface 29, the force acting to resist unseating of the closed valve assembly 88 is nullified by an equal force acting in the opposite axial direction. 35 Hence, valve 14 is endowed with a well-defined and predictable opening characteristic which is important in achieving a desired control strategy for canister purging. Although once valve assembly 86 has unseated from seating surface 29, some counter-force continues to exerted on it by the force-balance mechanism. Generally speaking, the counter-force will progressively diminish along a gradient.

Once the valve has opened beyond an initial unseating transition, sonic nozzle structure 28 becomes effective as a true sonic nozzle (assuming sufficient pressure differential between inlet and outlet ports) providing sonic purge flow and being essentially insensitive to varying manifold vacuum. Assuming that the properties of the vapor being purged, such as specific heat, gas constant, and temperature, are constant, mass flow through the valve is a function of essentially only the pressure upstream of the sonic nozzle. The restriction between the valve element and the valve seat upon initial valve element unseating and final valve element reseating does create a pressure drop preventing full sonic nozzle operation, but because these transitions are well-defined, and of relatively short duration, actual valve operation is well-correlated with the actual purge control signal applied to it. The inventive valve is well-suited for operation by a pulse width modulated (PWM) purge control signal waveform from engine management computer 22 composed of rectangular voltage pulses having substantially constant voltage amplitude and occurring at selected frequency.

The constructions of valve assembly 86 and force-balancing mechanism 92 are advantageous. Although the materials of valve head 88, diaphragm 94 and seal 90 are polymeric, they may have certain diverse characteristics. Seal 90 may have a characteristic that allows it to be molded directly onto valve head 88. Such compatibility may not exist between the material of diaphragm 94 and valve head 88. Hence retainer 96, its stacked association with valve head 88, and the use of fastener 98, as herein disclosed, provides a construction that accomplishes the required sealing of both the diaphragm and the seal element to the valve head.

Once all the internal parts of valve 14 have been assembled to body part 24, overmold 32 is created to complete the enclosure. The overmold is created by known injection molding techniques. At joint 34 the overmold material seals to body part 24. Similar sealing occurs around terminals 52, 54. Overmold material encloses the entire side of solenoid 30. At the base of wall 32A overmold material also forms a seal, but leaves access to stator part 60. Stator part 60 provides for proper calibration of the valve by setting the start-to-open point in relation to a certain current flow in coil 42.

The combination of various features provides a valve that has improved noise attenuation, durability, and performance. The taper angles of tip 72 and depression 74 have been found to influence the force vs. current characteristic of solenoid 30. It has been discovered that taper angles of approximately 30° relative to axis 44 improve low-voltage operation of valve 14 by lowering the "pull in" voltage and improving the low flow, start-to-open characteristic of the valve. For example, initial flow upon valve opening has been reduced from about 2 SLPM to about 1.5 SLPM by incorporation of the taper.

Figure 6:
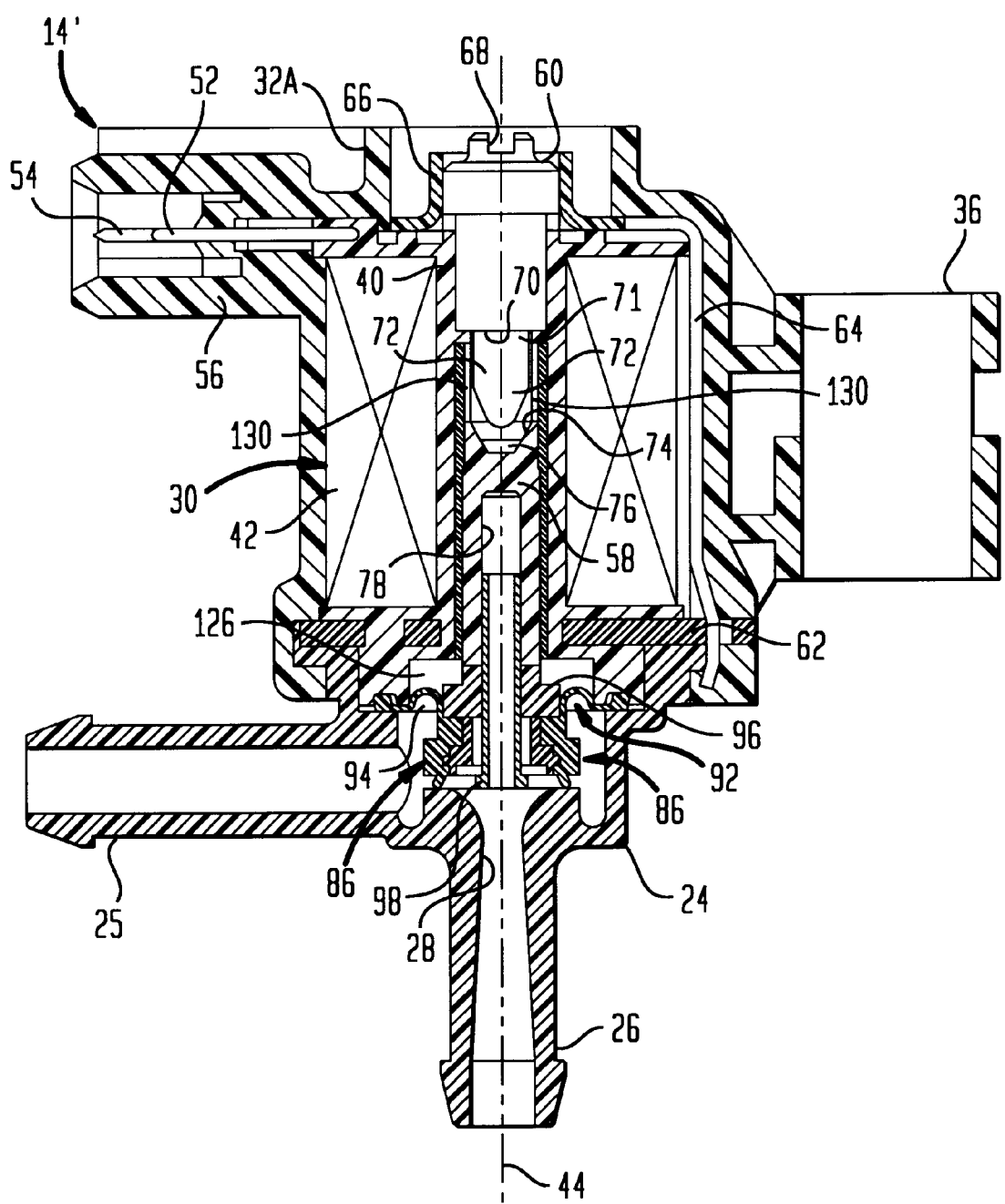
FIG. 6 is a view similar to FIG. 2, but showing another embodiment.
Figure 7:
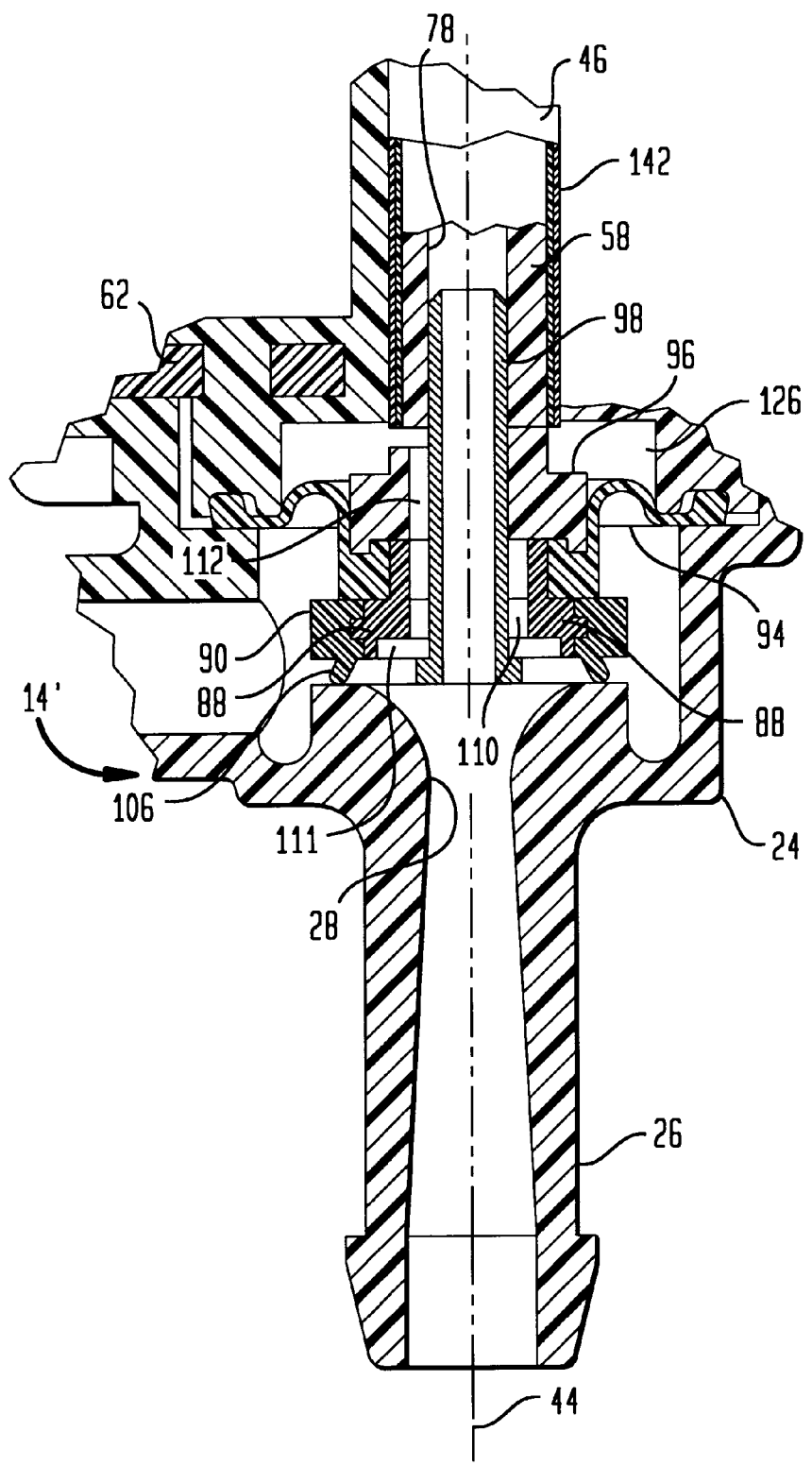
FIG. 7 is an enlarged fragmentary view of a portion of FIG. 6.

Another embodiment of valve is designated generally by the reference numeral 14' in FIGS. 6–7 and like parts of both valves 14, 14' are designated by like reference numerals. Valve 14' is like valve 14 except that cushioning of lateral components of armature motion is provided by a different construction. Instead of employing cushion 80 and member 82, the combination of a circular cylindrical sleeve 140 and liner 142 is provided. Sleeve 140 is preferably a non-magnetic thin-walled metal within which armature 58 has a close, but low-friction, sliding fit. Liner 142 is preferably an viscoelastic material that is disposed between sleeve 140 and the wall of bobbin through-hole 46. The sleeve and liner are disposed within through-hole 46, preferably at least co-extensive with the length of armature 58 that is within the through-hole. It may be desirable to bond liner 142 to sleeve 140 so that the two form a single part that can be assembled into the valve during fabrication of the valve. Although not specifically illustrated by a separate drawing Figure, both forms of lateral armature cushioning could be incorporated into a valve, if appropriate for a particular usage.

Figure 8:
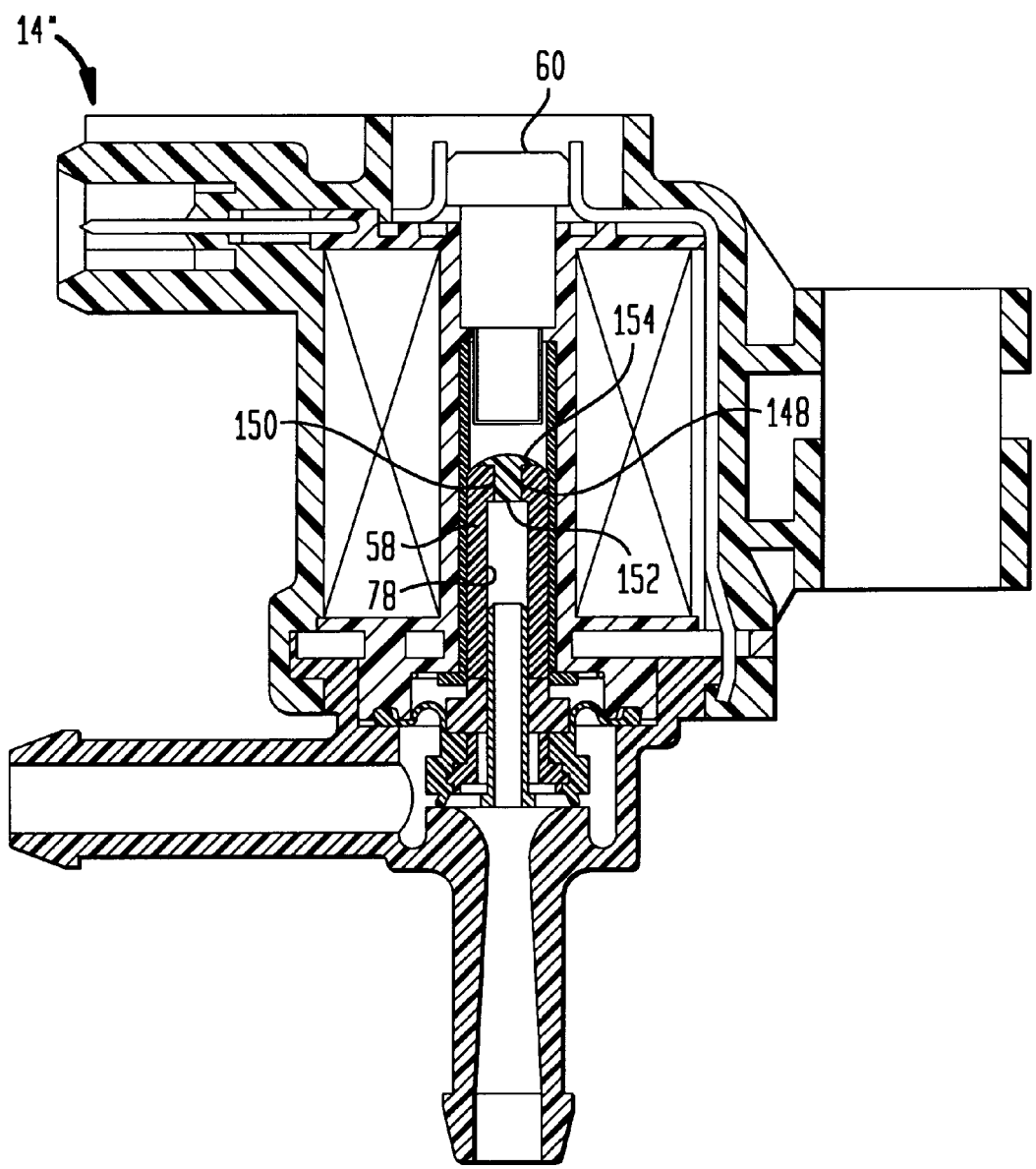
FIG. 8 is a view similar to FIG. 2, but showing another embodiment.

The embodiment of valve 14" in FIG. 8 is like the first embodiment except that the interface between stator part 60 and armature 58 is different. In valve 14" stator part 60 has a flat distal end instead of a tapered one. The juxtaposed end of armature 58 comprises a hole 148 that extends to, but is of slightly smaller diameter than, hole 78. A cushion 150 is mounted on this end of the armature, having a stem 152 fitting to hole 148, and a mushroom-shaped head 154 confronting the flat distal end of stator part 60. This valve shows the incorporation of both types of lateral impact cushioning, namely ring 84 and the sleeve-liner 140, 142.

While a presently preferred embodiment of the invention has been illustrated and described, it should be appreciated that principles are applicable to other embodiments that fall within the scope of the following claims.

We claim:

1. An electric-operated valve assembly comprising a body having an internal main flow passage between a first port and a second port, an annular valve seat in circumscribing relation to the passage, an electric actuator comprising an armature and a guide hole within which the armature is guided substantially for axial motion but with some lateral clearance that allows slight lateral displacements of the armature to occur as the armature is moved axially by the actuator, a valve which is connected to a portion of the armature that protrudes axially outward from an open axial end of the guide hole and which is operated by the armature to selectively open and close the passage, and a medium that cushions impact of lateral displacements of the armature, the medium being disposed around that portion of the armature that protrudes axially outward from an open end of the guide hole, and the medium having a radially confronting portion a) which radially confronts that portion of the armature that protrudes axially outward from an open end of the guide hole, and b) through which that portion of the armature that protrudes axially outward from an open end of the guide hole axially moves when the armature is moved axially by the actuator.

2. A valve assembly as set forth in claim 1 wherein the medium comprises an annular member.

3. A valve assembly as set forth in claim 2 wherein the guide hole is in a bobbin on which an electromagnetic coil is disposed, the bobbin having an end wall containing the open end of the guide hole from which that portion of the armature protrudes axially outward, and further including a retainer for retaining the annular member on the bobbin end wall.

4. An electric-operated valve assembly comprising a body having an internal main flow passage between a first port and a second port, an annular valve seat in circumscribing relation to the passage, an electric actuator comprising an armature and a guide hole within which the armature is guided substantially for axial motion but with some lateral clearance that allows slight lateral displacements of the armature to occur as the armature is moved axially by the actuator, a valve which is connected to a portion of the armature that protrudes axially outward from an open axial end of the guide hole and which is operated by the armature to selectively open and close the passage, and a medium that cushions impact of lateral displacements of the armature, the medium being disposed around that portion of the armature that protrudes axially outward from an open end of the guide hole, wherein the medium comprises an annular member, the guide hole is in a bobbin on which an electromagnetic coil is disposed, the bobbin has an end wall containing the open end of the guide hole from which that portion of the armature protrudes axially outward, further including a retainer for retaining the annular member on the bobbin end wall, and wherein the bobbin end wall containing the open end of the guide hole from which that portion of the armature protrudes axially outward comprises a cavity surrounding the open end of the guide hole, and the retainer is lodged in the cavity to retain the annular member on the bobbin end wall.

5. A valve assembly as set forth in claim 4 wherein the retainer comprises an annular member on an inner margin of which the annular member is disposed.

6. An electric-operated valve assembly comprising a body having an internal main flow passage between a first port and a second port, an annular valve seat in circumscribing relation to the passage, an electric actuator comprising an armature and a guide hole within which the armature is guided substantially for axial motion but with some lateral clearance that allows slight lateral displacements of the armature to occur as the armature is moved axially by the actuator, a valve which is connected to a portion of the armature that protrudes axially outward from an open axial end of the guide hole and which is operated by the armature to selectively open and close the passage, and a medium that cushions impact of lateral displacements of the armature, the medium being disposed around that portion of the armature that protrudes axially outward from an open end of the guide hole, wherein the medium comprises an annular member, the guide hole is in a bobbin on which an electromagnetic coil is disposed, the bobbin has an end wall containing the open end of the guide hole from which that portion of the armature protrudes axially outward, further including a retainer for retaining the annular member on the bobbin end wall, and including stator structure providing a portion of a magnetic circuit that includes the armature for conducting magnetic flux created by electric current flow in the coil, the stator structure including a stator part separated from the armature by an air gap, and further including a cushion for cushioning impact between the armature and the stator part.

7. A valve assembly as set forth in claim 6 wherein the stator part and the armature comprise complementary tapered surfaces at the air gap.

8. A valve assembly as set forth in claim 7 wherein the tapered surfaces are at approximately a 30° angle relative to an axis that is coaxial with the stator part and the armature.

9. A valve assembly as set forth in claim 7 wherein one of the tapered surfaces comprises a depression in the armature and the cushion is disposed at the base of the depression.

10. An electric-operated valve assembly comprising a body having an internal main flow passage between a first port and a second port, an annular valve seat in circumscribing relation to the passage, an electric actuator comprising an armature and a guide hole within which the armature is guided substantially for axial motion but with some lateral clearance that allows slight lateral displacements of the armature to occur as the armature is moved axially by the actuator, a valve which is connected to a portion of the armature that protrudes axially outward from an open axial end of the guide hole and which is operated by the armature to selectively open and close the passage, and a medium that cushions impact of lateral displacements of the armature, the medium being disposed around that portion of the armature that protrudes axially outward from an open end of the guide hole, and further including a counter-force mechanism that, when the valve is closing the passage, applies a counter-force to the valve opposite the force due to pressure differential between the first and second ports, the counter-force mechanism including a chamber space that is internal to the body and bounded in part by a fluid-impermeable movable wall that extends between and is sealed to both the body and the valve, and a communication passage that communicates one of the ports to the chamber space when the valve is closing the passage, wherein the valve comprises plural parts in assembly relation, one of the plural parts being a valve head and another of the plural parts being a retainer, the valve head and the retainer coacting to hold the movable wall sealed to the valve.

11. A valve assembly as set forth in claim 10 wherein a fastener passes through both the valve head and the retainer to hold the valve in assembly with the armature, the communication passage passes through both the valve head and the retainer, both the valve head and the retainer comprise through-holes forming the communication passage, and the fastener comprises a head that engages the valve head without obstruction of flow through the communication passage.

12. A valve assembly as set forth in claim 10 wherein the actuator comprises a wall coacting with the valve body to hold the movable wall sealed to the valve body.

13. A valve assembly as set forth in claim 12 wherein the actuator wall coacting with the valve body to hold the movable wall sealed to the valve body comprises an end wall of a bobbin on which an electromagnetic coil is disposed.

14. A valve assembly as set forth in claim 13 further including an overmold that encloses the coil and secures the bobbin to the valve body.

15. A valve assembly as set forth in claim 14 including stator structure providing a portion of a magnetic circuit that includes the armature for conducting magnetic flux created by electric current flow in the coil, the stator structure including a positionable stator part that is selectively positionable relative to the armature to set an air gap between the two, and the overmold including an opening providing external access to the stator part.

16. A valve assembly as set forth in claim 1 wherein one of said ports comprises sonic nozzle structure.

17. An electric-operated valve assembly comprising a body having an internal main flow passage between a first port and a second port, an annular valve seat in circumscribing relation to the passage, an electric actuator comprising a guide hole, a walled sleeve extending axially in the guide hole, an armature guided substantially for axial motion within the sleeve but with some lateral clearance that allows slight lateral displacements of the armature to occur as the armature is moved axially by the actuator, a valve operated by the armature to selectively open and close the passage, and a medium for cushioning impact of lateral displacements of the armature, the medium being disposed axially between the sleeve and the guide hole.

18. A valve assembly as set forth in claim 17 wherein the guide hole is contained in the core of a bobbin on which an electromagnetic coil is disposed.

19. A valve assembly as set forth in claim 17 wherein the medium comprises a tubular liner lining the exterior of the sleeve.

\* \* \* \* \*